US005104763A

United States Patent [19]

Ong et al.

[11] Patent Number: 5,104,763

[45] Date of Patent: Apr. 14, 1992

[54] ENCAPSULATED TONER COMPOSITIONS

[75] Inventors: Beng S. Ong, Mississauga; Barkev Keoshkerian, Thornhill; Kayong K. Koch, Waterloo; Fernando P. Yulo, Mississauga, all of Canada

[73] Assignee: Xerox Corporation, Stamford, Conn.

[21] Appl. No.: 524,946

[22] Filed: May 18, 1990

[51] Int. Cl.$^5$ .......................... G03G 9/00; G03C 1/72; B32B 5/16; C08G 3/48

[52] U.S. Cl. .................................... 430/109; 430/137; 430/138; 428/402.24; 525/63

[58] Field of Search ........................ 430/138, 109, 137; 428/402.24; 525/63

[56] References Cited

U.S. PATENT DOCUMENTS

| | | | |
|---|---|---|---|
| Re. 33,172 | 2/1990 | Gruber et al. | 430/39 |
| 4,097,404 | 6/1978 | Brown | 252/316 |
| 4,514,484 | 4/1985 | Pon et al. | 430/106.6 |
| 4,517,268 | 5/1985 | Gruber et al. | 430/39 |
| 4,565,773 | 1/1986 | Matrick | 430/331 |
| 4,640,881 | 2/1987 | Dennis | 430/106.6 |
| 4,740,443 | 4/1988 | Nakahara et al. | 430/106.6 |
| 4,766,037 | 8/1988 | Watanabe et al. | 430/138 X |
| 4,803,144 | 2/1989 | Hosoi | 430/106.6 |
| 4,931,362 | 6/1990 | Zsifkovits et al. | 428/402.22 |
| 4,971,885 | 11/1990 | Hammann et al. | 430/138 |
| 5,023,159 | 6/1991 | Ong et al. | 430/109 |

FOREIGN PATENT DOCUMENTS

| | | | |
|---|---|---|---|
| 0184259 | 9/1985 | Japan | 430/109 |
| 0186870 | 9/1985 | Japan | 430/111 |
| 0186871 | 9/1985 | Japan | 430/111 |

*Primary Examiner*—Marion E. McCamish
*Assistant Examiner*—S. Crossan
*Attorney, Agent, or Firm*—E. O. Palazzo

[57] ABSTRACT

An encapsulated toner composition comprised of a core comprised of a polymer, pigment, dye or mixtures thereof, which core is encapsulated in a polymeric shell having incorporeated therein an organosilane moiety as an integral part of the shell structure.

16 Claims, No Drawings

ENCAPSULATED TONER COMPOSITIONS

BACKGROUND OF THE INVENTION

The present invention is generally directed to toner compositions, and more specifically to encapsulated toner compositions. In one embodiment, the present invention is related to encapsulated toner compositions comprised of a core and a polymeric shell thereover preferably prepared by interfacial polymerization which shell contains an organosilane moiety derived from certain organosilane components such as a functionalized alkoxysilane, chlorosilane, siloxysilane and the like, which organosilane reagent is capable of reacting with the shell monomers, and undergoing hydrolysis and a condensation reaction. In an embodiment of the present invention there are provided encapsulated toner compositions comprised of a core comprised of a suitable known polymer resin, and dye or pigment particles, which core is encapsulated within a polymeric shell coating such as a polyurea, a polyurethane, a polyamide, a polyester, or mixtures thereof, and wherein the shell has incorporated therein as an integral part of its structure an organosilane moiety derived from a functionalized organosilane enabling a number of advantages for the resulting toner including no agglomeration or minimal agglomeration, and minimized or no image ghosting when such a toner is selected for the development of images. In another embodiment of the present invention, there is provided an encapsulated toner composition comprising a core of an acrylic, methacrylic, styrene polymer resin or their copolymeric derivatives, pigment, and encapsulated thereover a polymeric shell wherein the shell has incorporated therein an organosilane moiety obtained from a functionalized alkoxysilane, a halosilane, a siloxysilane, or mixtures thereof. In a specific embodiment of the present invention, there are provided encapsulated toner compositions comprised of a polymeric shell obtained by interfacial polymerization, which shell has incorporated therein as an integral component of the shell material an organosilane component derived from, for example, a functionalized alkoxysilane, halosilanes such as chlorosilane, siloxysilane and the like, and a core comprised of dyes, pigments or mixtures thereof. Examples of advantages associated with the toner compositions of the present invention in embodiments thereof include the elimination or the minimization of image ghosting, improved toner fixing characteristics, superior release properties enabling their selection, for example, in imaging systems wherein a release fluid such as a silicone oil is avoided, no or minimal toner agglomeration, excellent powder flow characteristics, no or minimal leeching of the core components, and avoidance of core resin component adherence to the imaging components such as, for example, dielectric receivers or photoreceptors. The toner compositions of the present invention can be selected for a variety of known reprographic imaging processes including electrophotographic and ionographic processes. In one embodiment, the toner compositions can be selected for pressure fixing processes wherein the image is fixed with pressure. Pressure fixing is common in ionographic processes in which latent images are generated on a dielectric receiver such as silicon carbide, reference U.S. Pat. No. 4,885,220 entitled Amorphous Silicon Carbide Electroreceptors, the disclosure of which is totally incorporated herein by reference. The latent images can then be toned with a conductive encapsulated toner of the present invention by inductive single component development, and transferred and fixed simultaneously (transfix) in one single step onto paper with pressure. Specifically, the toner compositions of the present invention can be selected for the commercial Delphax printers, such as the Delphax S9000, S6000, S4500, S3000, and Xerox printers such as the 4060 TM and 4075 TM wherein, for example, transfixing is utilized. In another embodiment, the toner compositions of the present invention can be utilized in xerographic imaging apparatus wherein image toning and transfer are accomplished electrostatically, and transferred images are fixed in a separate step by means of a pressure roll with or without the assistance of thermal or photochemical energy fusing. Also, the encapsulated toners of the present invention in an embodiment thereof can be selected, it is believed, for magnetic image character image recognition (MICR) processes, reference U.S. Pat. No. 4,517,268 and Reissue 33,172, the disclosures of which are totally incorporated herein by reference, and wherein with such processes image smearing may be avoided or minimized.

The toner compositions of the present invention can, in one specific embodiment, be prepared by first dispersing the toner precursor materials into stabilized microdroplets of controlled droplet size and size distribution, followed by shell formation around the microdroplets via interfacial polymerization, and subsequently generating the core polymer resin within the newly formed microcapsule by addition polymerization, preferably free-radical polymerization within the resultant microcapsules. Thus, in one embodiment, the present invention is directed to a process for the simple, and economical preparation of pressure fixable encapsulated toner compositions by interfacial/free-radical polymerization methods wherein there are selected as the core polymer resin precursors an addition-type monomer or monomers, a colorant including pigments, dyes or mixtures thereof, and shell-forming monomers, wherein at least one of the shell monomers is oil-soluble, and at least one is water-soluble; which monomers are capable of undergoing condensation polymerization at the microdroplet/water interface. The shell precursors in the aqueous phase also include at least one suitably functionalized organosilane reagent such as, for example, a functionalized alkoxysilane capable of undergoing reaction with the oil-soluble shell monomer in the microdroplet phase. Other process embodiments of the present invention relate to, for example, interfacial/free-radical polymerization processes for obtaining encapsulated colored toner compositions. Further, in another process aspect of the present invention the encapsulated toners can be prepared without organic solvents as the diluting vehicle or as a reaction medium, thus eliminating explosion hazards associated therewith; and furthermore, these processes, therefore, do not require expensive and hazardous solvent separation and recovery steps. Moreover, with the aforementioned process of the present invention there is obtained in an embodiment thereof improved product yield per unit volume of reactor size since, for example, the extraneous solvent component can be replaced by liquid core and shell monomers.

Encapsulated and cold pressure fixable toner compositions are known. Cold pressure fixable toners have a number of advantages in comparison to toners that are fused by heat, primarily relating to the utilization of less energy since the toner compositions can be fused at room temperature. Nevertheless, many of the prior art cold pressure fixable toner compositions suffer from a number of deficiencies. For example, these toner compositions must usually be fixed under high pressure, which has a tendency to severely disrupt the toner fixing characteristics of the toner selected. This can result in images of low resolution, or no images whatsoever. Also, with some of the prior art cold pressure toner compositions substantial image smearing can result from the high pressures selected. The high fixing pressure also generates in some instances glossy images and objectionable paper calendering problem. Additionally, the preparative processes of the prior art pressure fixing toner compositions usually employ organic solvents as the diluting vehicles and reaction media, and this could drastically increase the toner's manufacturing cost because of the expensive solvent separation and recovery procedure, and the necessary precautions that have to be undertaken to prevent the solvent associated hazards. Moreover, the involvement of an organic solvent in the prior art processes also may decrease the product yield per unit volume of reactor size. In addition, the solvents in many prior art processes may have deleterious effects on toner particle morphology and bulk density as a result of their removal from the toner particles during the toner isolation stage, thus causing shrinkage or collapse of the toner particles resulting in a toner of very low bulk density, which disadvantages are substantially eliminated with the process of the present invention in an embodiment thereof. Furthermore, with many of the prior art processes narrow size dispersity toner particles cannot be easily obtained by conventional bulk homogenization techniques as contrasted with the process of the present invention wherein narrow size dispersity toner particles can be obtained. More specifically, thus with the encapsulated toners of the present invention, control of the toner physical properties of both the core and shell materials can be desirably achieved. Specifically, with the encapsulated toners of the present invention undesirable leaching or loss of core components is minimized or avoided, and image ghosting is eliminated, in many instances, primarily in view of the presence in the shell of an organosilane moiety formed from the reaction of functionalized alkoxysilane, chlorosilane, or siloxysilane reagent with the shell monomer or monomers. Image ghosting, which is one of the known common phenomena in ionographic printing processes, refers to, for example, the contamination of dielectric receiver by residual toner materials which cannot be readily removed in the cleaning process. The result is the retention of latent images on the dielectric receiver surface after cleaning, and the subsequent unwarranted development of these images. One of the common causes of image ghosting is related to the leaching of the sticky core polymer resin out to the toner's surface leading to their adherence to the dielectric receiver during the image development process.

In a patentability search report the following United States patents were listed: U.S. Pat. No. 4,514,484 directed to a powder suitable for developing latent images comprising magnetic particles coated with a mixture of a thermoplastic resin and a silane, see for example the Abstract of the Disclosure; note column 3, beginning at line 15, wherein it is indicated that into the organic thermoplastic resin is incorporated a silane selected from those illustrated; also incorporated into the thermoplastic resin are magnetic materials, see column 3, beginning at line 35; U.S. Pat. No. 4,565,773 directed to dry toners surface coated with nonionic siloxane polyoxy alkalene copolymers with a polar end, see the Abstract of the Disclosure; and primarily of background interest is U.S. Pat. No. 4,640,881; 4,740,443; 4,803,144 and 4,097,404, the disclosure of which is totally incorporated herein by reference.

The following prior art, all United States patents, are mentioned: U.S. Pat. No. 4,770,968 directed to polysiloxane butadiene terpolymer toner resins, reference for example column 4, and note the formulas of FIGS. 1 to 6, including FIG. 2B, which toners can be selected wherein silicone release oils are avoided with no apparent teaching in this patent directed to encapsulated toners; U.S. Pat. No. 4,814,253 directed to encapsulated toners comprised of domains containing a polymer component having dispersed therein a release composition and thereover a host resin component comprised of toner resin particles and pigment particles, see for example the Abstract of the Disclosure and column 4, and note column 4 wherein there is illustrated as one of the components of the encapsulated toner domains comprised of styrene butadiene block polymers such as Kraton, styrene copolymers, or styrene siloxanes, which components have entrapped or dissolved therein mineral oils or silicon oils; U.S. Pat. No. 4,430,408 relating to developer compositions containing a fluorene modified alkyl siloxane and a surface treatment carbon black, reference the Abstract of the Disclosure for example; U.S. Pat. No. 4,758,491 relating to dry toner and developer compositions with a multiphase polyorgano siloxane block or graft condensation copolymer, which provides polyorgano siloxane domains of a particular size and concentration at the toner particle surfaces; and U.S. Pat. No. 4,820,604 directed to toner compositions comprised of resin particles, pigment particles, and a sulfur containing organo polysiloxane wax such as those of the formulas illustrated in the Abstract of the Disclosure.

There are disclosed in U.S. Pat. No. 4,307,169 microcapsular electrostatic marking particles containing a pressure fixable core, and an encapsulating substance comprised of a pressure rupturable shell, wherein the shell is formed by an interfacial polymerization. One shell prepared in accordance with the teachings of this patent is a polyamide obtained by interfacial polymerization. Furthermore, there are disclosed in U.S. Pat. No. 4,407,922 pressure sensitive toner compositions comprised of a blend of two immiscible polymers selected from the group consisting of certain polymers as a hard component, and polyoctyldecylvinylether-co-maleic anhydride as a soft component. Interfacial polymerization processes are also selected for the preparation of the toners of this patent. Also, there are disclosed in the prior art encapsulated toner compositions containing in some instances costly pigments and dyes, reference for example the color photocapsule toners of U.S. Pat. Nos. 4,399,209; 4,482,624; 4,483,912 and 4,397,483.

Moreover, illustrated in U.S. Pat. No. 4,758,506, the disclosure of which is totally incorporated herein by reference, are single component cold pressure fixable toner compositions, wherein the shell selected can be prepared by an interfacial polymerization process.

Disclosed in U.S. Pat. No. 5,045,422 entitled Encapsulated Toner Compositions, the disclosure of which is totally incorporated herein by reference, are encapsulated compositions containing cores comprised of a fluorocarbon and a monomer or monomers. More specifically, there is illustrated in the aforementioned Patent an encapsulated toner composition comprised of a core with a fluorocarbon-incorporated resin binder, pigment or dyes, and a polymeric shell; and an encapsulated toner composition comprised of a core comprised of a fluorocarbon-incorporated resin binder derived from the copolymerization of an addition-type monomer and a functionalized fluorocarbon compound represented by Formula (I), wherein A is a structural moiety containing an addition-polymerization functional group; B is a fluorine atom or a structural moiety containing an addition-polymerization functional group; and x is the number of difluoromethylene functions, pigment or dyes, and a polymeric shell. Also, illustrated in U.S. Pat. No. 5,013,630 entitled Encapsulated Toner Compositions, the disclosure of which is totally incorporated herein by reference, is an encapsulated toner composition comprised of a core comprised of pigments or dyes, and a polysiloxaneincorporated core binder resin, which core is encapsulated in a shell. Moreover, illustrated in U.S. Pat. No. 5,023,159, the disclosure of which is totally incorporated herein by reference, are encapsulated toners with a soft core comprised of silane modified polymer resin, a colorant, and a polymeric shell thereover. Specifically, in one embodiment there is disclosed in the aforementioned Patent encapsulated toners comprised of a core containing a silane-modified polymer resin, preferably obtained by free-radical polymerization, silane-modified pigment particles or dyes, and thereover a shell, preferably obtained by interfacial polymerization. The U.S. Pat. No. 5,023,149 in one embodiment is directed to an encapsulated toner composition comprised of a core comprised of the polymer product of a monomer or monomers, and a polyfunctional organosilicon component, and more specifically wherein the core is comprised of a silane-modified polymer resin having incorporated therein an oxysilyl (I), a dioxysilyl (II), or a trioxysilyl (III) function of the following formulas, pigment, dye particles or mixtures thereof; and a polymeric shell.

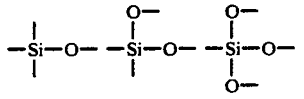

(I) (II) (III)

The aforementioned toners can be prepared by a number of different processes including the interfacial/free-radical polymerization process which comprises (1) mixing or blending of a core monomer or monomers, up to 25 in some embodiments, a functionalized organosilane, a free-radical initiator or initiators, pigment, and a shell monomer or monomers; (2) dispersing the resulting mixture of pigmented organic materials by high shear blending into stabilized microdroplets in an aqueous medium with the assistance of suitable dispersants or emulsifying agents; (3) thereafter subjecting the aforementioned stabilized microdroplets to a shell forming interfacial polycondensation; and (4) subsequently forming the core resin binder by heat-induced free-radical polymerization within the newly formed microcapsules. The shell forming interfacial polycondensation is generally accomplished at ambient temperature, but elevated temperatures may also be employed depending on the nature and functionality of the shell monomer selected. For the core polymer resin forming free-radical polymerization, it is generally effected at a temperature of from ambient temperature to about 100° C., and preferably from ambient or room temperature, about 25° F. temperature to about 85° F. In addition, more than one initiator may be utilized to enhance the polymerization conversion, and to generate the desired molecular weight and molecular weight distribution.

There is a need for encapsulated toner compositions with many of the advantages illustrated herein. More specifically, there is a need for encapsulated toners wherein image ghosting is eliminated or minimized, and wherein the toners enable image transfer efficiencies of from about 90 to about 99 percent in embodiment of the present invention. Also, there is a need for pressure fixable encapsulated toners which provide quality images with acceptable fixing levels, for example over 80 percent at low fixing pressure of, for example, 2,000 psi. Moreover, there is a need for encapsulated toners, including colored toners wherein image ghosting, and the like are avoided or minimized. Additionally, there is a need for encapsulated toners, including colored toners with excellent release characteristics enabling their selection in imaging systems without the use of surface release fluids such as silicone oils to prevent image offsetting to the fixing or fuser roll. Furthermore, there is a need for encapsulated toners, including colored toners with substantially no toner agglomeration, with long shelf life exceeding, for example, 18 months. Also, there is a need for encapsulated toners that have been surface treated with additives such as carbon blacks, graphite or the like to impart to their surface certain conductive characteristics such as providing a volume resistivity of from about $1\times10^3$ ohm-cm to about $1\times10^8$ ohm-cm. Furthermore, there is a need for encapsulated toners wherein surface additives, such as metal salts or metal salts of fatty acids and the like, are utilized to assist in the release of the images from the imaging component to the paper substrate. There is also a need for simple and economic processes for the preparation of encapsulated toners. Specifically, there is a need for interfacial/free-radical polymerization processes for black and colored encapsulated toner compositions comprised of a hard polymeric shell and a core, and wherein organic solvents are eliminated in their preparation in some embodiments. Moreover, there is a need for enhanced flexibility in the design and selection of the shell and core materials for pressure fixable encapsulated toners and/or flexibility controlling the toner physical properties such as the bulk density, particle size, and size dispersity.

SUMMARY OF THE INVENTION

It is an object of the present invention to provide encapsulated toner compositions with many of the advantages illustrated herein.

In another object of the present invention there are provided encapsulated toner compositions comprised of a core of polymer resin, pigments and/or dyes and thereover a shell prepared, for example, by interfacial polymerization, and wherein the shell polymer has incorporated therein as an integral part of its structure an organosilane moiety.

Another object of the present invention is the provision of encapsulated toners wherein image ghosting is eliminated in some embodiments, or minimized in other embodiments.

Further, another object of the present invention is the provision of encapsulated toners wherein toner agglomeration is eliminated.

Another object of the present invention is the provision of encapsulated toners with excellent flow properties.

Also, another object of the present invention is the provision of encapsulated toners wherein core component leaching or loss is eliminated in some embodiments, or minimized in other embodiments.

Moreover, another object of the present invention is the provision of encapsulated toners wherein image offsetting is eliminated in some embodiments, or minimized in other embodiments.

Additionally, another object of the present invention is the provision of encapsulated toners with extended shelf life.

Further, another object of the present invention is the provision of encapsulated toners with excellent release properties.

Also, another feature of the present invention is the provision of colored, that is other than black, encapsulated toners.

It is another object of the present invention to provide encapsulated toners wherein contamination of the imaging member, such as a dielectric receiver or a photoreceptor, is eliminated or minimized.

Another object of the present invention is the provision of encapsulated toners that can be selected for imaging processes, especially processes wherein cold pressure fixing is selected.

In another object of the present invention, there are provided simple and economical processes for black and colored toner compositions prepared by an interfacial/free-radical polymerization process in which the shell is generated by interfacial polymerization, which shell has incorporated therein an organosilane moiety, and the core is formed by free-radical polymerization.

Another object of the present invention resides in the provision of colored and black encapsulated toner compositions which provide a high image fix level of, for example, over 80 percent at a relatively low fixing pressure of, for example, 2,000 psi.

A further feature of the present invention is to provide encapsulated toner compositions which are suitable for duplex imaging applications.

Another objective of the present invention is to provide colored and black encapsulated toner compositions which are suitable for inductive single component development.

Additionally, in another object of the present invention there are provided insulative encapsulated toner compositions for use in electrostatic imaging and printing apparatuses.

In another feature of the present invention there are provided magnetic image character recognition processes with the encapsulated toners illustrated herein.

These other objectives and features of the present invention can be accomplished by the provision of toners and more specifically encapsulated toners. In one embodiment of the present invention, there are provided encapsulated toners comprised of a core comprised of a polymer, pigment or dye; and thereover a polymeric shell having incorporated therein as an integral part of the shell polymer structure, an organosilane component having an oxysilyl (I), dioxysilyl (II), or trioxysilyl (III) function, or a mixture thereof.

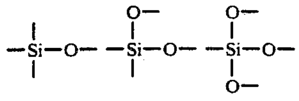

(I) (II) (III)

The present invention in an embodiment relates to an encapsulated toner composition comprised of a core comprised of the polymer product of a monomer or monomers, pigment, dyes, or mixtures thereof; and wherein the core is encapsulated in a polymeric shell preferably obtained by interfacial polymerization, which shell has incorporated therein an organosilane moiety derived from the reaction of a shell monomer or shell monomers, for example from about 2 to about 20 monomers with an organosilane selected from the group consisting of

 (1)

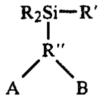 (2)

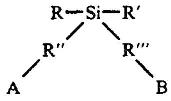 and (3)

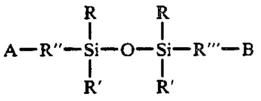 (4)

wherein R, and R' are independently selected from the group consisting of alkyl, preferably with from 1 to about 25 carbon atoms such as methyl, ethyl, propyl, butyl, pentyl, hexyl, heptyl, octyl, nonyl, dodecyl, and the like; alkoxy preferably with from 1 to about 25 carbon atoms, such as methoxy, ethoxy, propoxy butoxy, pentoxy, heptoxy, octoxy, and the like; aryloxy, preferably with from 6 to about 24 carbon atoms, such as phenoxy, methylphenoxy, ethylphenoxyl, propylphenoxy, and the like; halo, preferably chloro, and siloxy; R'' and R''' are alkylene with from about 1 to about 20 carbon atoms, alkynene, arylene with from about 6 to about 30 carbon atoms, or their substituted derivatives including amino substitution such as methylene, dimethylene, trimethylene, 2-chlorotrimethylene, tetramethylene, 2,2-dimethyltrimethylene, 2-methyltetramethylene, 3-aminopentamethylene, phenylene, xylylene, and the like; and A and B are independently selected from the group consisting of amino, hydroxy, aryloxy such as phenoxy, and mixtures thereof.

The aforementioned toners of the present invention can be prepared by a number of different processes including the interfacial/free-radical polymerization process which comprises (1) mixing or blending of a core monomer or monomers, up to 25 in some embodiments, a free-radical initiator or initiators, pigments, dyes or a mixture thereof, and an oil-soluble shell monomer or monomers; (2) dispersing the resulting mixture by high shear blending into stabilized microdroplets in an aqueous medium with the assistance of suitable dispersants or emulsifying agents; (3) thereafter subjecting the aforementioned stabilized microdroplets to a shell forming interfacial polycondensation by adding a water-soluble shell monomer or monomers and a suitably functionalized organosilane illustrated herein; and (4) subsequently forming the core resin binder by heat-induced free-radical polymerization within the newly formed microcapsules. The shell forming interfacial polycondensation is generally accomplished at ambient temperature, but elevated temperatures may also be employed depending on the nature and functionality of the shell monomer selected. For the core polymer resin forming free-radical polymerization, it is generally effected at a temperature of from ambient temperature to about 100° C., and preferably from ambient or room temperature, about 25° F. temperature to about 90° F. In addition, more than one initiator may be utilized to enhance the polymerization conversion, and to generate the desired molecular weight and molecular weight distribution.

Further, in accordance with the present invention there are provided processes for black and colored pressure fixable toner compositions which are obtained without organic solvents as the diluting vehicles or as reaction media. These processes involve dispersing a mixture of organic materials and colorants to form stabilized microdroplets in an aqueous medium containing a dispersant or emulsifying agent. The resulting organic mixture is comprised of from about 20 to about 95 weight percent of core monomer or monomers, about 1 to 65 weight percent of a colorant or colorants, about 2 to 25 weight percent of an oil-soluble shell monomer component and a free-radical initiator. The shell formation around the dispersed, stabilized microdroplets via interfacial polycondensation is initiated by adding to the reaction mixture a water-soluble shell monomer component together with a suitably functionalized organosilane reagent into the aqueous phase. Subsequently, the reaction mixture is subjected to heating to initiate free-radical polymerization to form the desired core polymer resin within the newly formed microcapsules.

Examples of core monomers present in effective amounts, for example of from about 20 to about 95 weight percent, selected include, but are not limited to, addition-type monomers such as acrylates, methacrylates, and the like including propyl acrylate, propyl methacrylate, butyl acrylate, butyl methacrylate, hexyl acrylate, pentyl acrylate, pentyl methacrylate, hexyl acrylate, hexyl methacrylate, cyclohexyl acrylate, cyclohexyl methacrylate, lauryl acrylate, lauryl methacrylate, stearyl acrylate, stearyl methacrylate, benzyl acrylate, benzyl methacrylate, ethoxypropyl acrylate, ethoxypropyl methacrylate, heptyl acrylate, heptyl methacrylate, isobutyl acrylate, isobutyl methacrylate, methylbutyl acrylate, methylbutyl methacrylate, tolyl acrylate, tolyl methacrylate, styrene, dodecyl styrene, hexyl methyl styrene, nonyl styrene, tetradecyl styrene, other substantially equivalent addition monomers, and the like. Suitable functionalized organosilane reagents that can be preferably selected for incorporation into the shell polymer structure by reaction with the shell monomers are the organosilanes illustrated herein, including organosilanes having alkoxy, halo, preferably chloro, siloxy substituents or a mixture thereof on the silicon atom, together with a proper functionality such as amino, hydroxy, phenoxy and the like, capable of reacting with the shell monomer from the microdroplet phase. Effective amounts of organosilane components selected are, for example, from about 0.1 to about 20 weight percent, and preferably from 1 to about 10 weight percent of the toner.

Various known colorants or mixtures thereof, present in the core in an effective amount of, for example, from about 1 to about 75 percent by weight of toner, and preferably in an amount of from about 5 to about 60 weight percent that can be selected include carbon black, magnetic pigments, such as Mobay magnetites MO8029, MO8060, Columbian magnetites, Mapico Blacks and surface treated magnetites, Pfizer magnetites CB4799, CB5300, CB5600, MCX6369, Bayer magnetites, Bayferrox 8600, 8610, Northern Pigments magnetites NP-604, NP-608, Magnox magnetites TMB-100 or TMB-104, and other equivalent black pigments. As colored pigments there can be selected Heliogen Blue L6900, D6840, D7080, D7020, Pylam Oil Blue and Pylam Oil Yellow, Pigment Blue 1 available from Paul Uhlich & Company Inc., Pigment Violet 1, Pigment Red 48, Lemon Chrome Yellow DCC 1026, E.D. Toluidine Red and Bon Red C available from Dominion Color Corporation Ltd., Toronto, Ontario, NOVAperm Yellow FGL, Hostaperm Pink E from Hoechst, Cinquasia Magenta available from E.I. DuPont de Nemours & Company, and the like. Generally, colored pigments that can be selected are red, blue, green, brown, cyan, magenta, or yellow pigments, and mixtures thereof. Examples of magenta materials that may be selected as pigments include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyan materials that may be used as pigments include copper tetra-(octadecyl sulfonamido) phthalocyanine, x-copper phthalocyanine pigment listed in the Color Index as CI 74160, CI Pigment Blue, and Anthrathrene Blue identified in the Color Index as CI 69810, Special Blue X-2137, and the like; while illustrative examples of yellow pigments that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Known colored magnetites, such as mixtures of Mapico Black, and cyan components may also be used as pigments for the toners of the present invention.

Examples of typical shell polymers include polyureas, polyamides, polyesters, polyurethanes, mixtures thereof, and other similar polycondensation products. The shell amounts are generally from about 5 to about 30 weight percent of the toner, and have a thickness generally, for example, of less than about 5 microns, and more specifically from about 0.1 micron to about 3 microns. Other shell polymers, shell amounts, and thicknesses may be selected.

The shell forming monomer components present in the organic phase are preferably comprised of diisocyanates, diacyl chloride, bischloroformate, together with appropriate polyfunctional crosslinking agents such as triisocyanate, triacyl chloride, and the like. Illustrative examples of the shell monomer components include benzene diisocyanate, toluene diisocyanate, diphenylmethane diisocyanate, cyclohexane diisocyanate, hexane diisocyanate, adipoyl chloride, fumaryl chloride, suberoyl chloride, succinyl chloride, phthaloyl chloride, isophthaloyl chloride, terephthaloyl chloride, ethylene glycol bischloroformate, diethylene glycol bischloroformate, and the like. The water-soluble shell forming monomer components which are added to the aqueous phase include polyamine or polyol including bisphenol, and an organosilane reagent(s) as described hereinbefore, the nature of which is dependent on the shell properties desired. Illustrative examples of the water-soluble shell monomers that react with the aforementioned diisocyanates, and the like include ethylenediamine, triethylenediamine, diaminotoluene, diaminopyridine, bis(aminopropyl)piperazine, bisphenol A, bisphenol Z, and the like. When desired, a water soluble crosslinking component such as triamine or triol can also be added to improve the mechanical strength of the shell structure.

In one specific embodiment of the present invention, there is provided an improved process for the preparation of encapsulated toner compositions, which process comprises mixing and dispersing a core monomer or monomers, pigment particles, dyes, or mixtures thereof, and a shell monomer component into microdroplets of specific droplet size and size distribution in an aqueous medium containing a dispersant or stabilizer wherein the volume average diameter of the microdroplet is preferably from about 5 microns to about 30 microns, and its volume average droplet size dispersity is preferably less than 1.4 as determined from Coulter Counter measurements of the microcapsule particles after encapsulation; forming a microcapsule shell around the microdroplets via interfacial polymerization by adding a water-soluble shell monomer component and the organosilane component; and subsequently affecting a free-radical polymerization to form a core resin binder within the newly formed microcapsules by, for example, heating the reaction mixture from room temperature to about 90° C. for a period of from about 1 to about 10 hours. Stabilizers selected for the process of the present invention include water soluble polymers such as poly(vinyl alcohols), methyl cellulose, hydroxypropyl cellulose, hydroxyethylmethyl cellulose and the like. Illustrative examples of free-radical initiators selected for the preparation of the toners of the present invention include azo compounds such as 2-2'-azodimethylvaleronitrile, 2-2'-azoisobutyronitrile, azobiscyclohexanenitrile, 2-methylbutyronitrile or any combination of these azo compounds with the quantity of initiator(s) being, for example, from about 0.5 percent to about 10 percent by weight of that of core monomer(s). Interfacial polymerization processes selected for the toner shell formation and shells thereof are as illustrated, for example, in U.S. Pat. Nos. 4,000,087 and 4,307,169, the disclosures of which are totally incorporated herein by reference.

Illustrative specific examples of functionalized organosilanes selected for chemical incorporation into the shell structure in an effective amount, for example, in one embodiment in an amount of from 0.1 weight percent to about 30, and preferably from about 0.5 to about 10 weight percent of toner include 4-aminobutyldimethylmethoxysilane, 4-aminobutylmethyldimethoxysilane, 4-aminobutyltrimethoxysilane, 4-aminobutyltriethoxysilane, N-(2-aminoethyl)-3-aminopropylmethyldimethoxysilane, N-(2-aminoethyl)-3-aminopropyltrimethoxysilane, N-(6-aminohexyl)-3-aminopropyltrimethoxysilane, p-aminophenyltrimethoxysilane, p-N-(2-aminoethyl)-aminomethylphenethyltrimethoxysilane, 3-aminopropylmethyldimethoxysilane, 3-aminopropyltrimethoxysilane, 3-[bis(2-hydroxyethyl)amino]-propyltriethoxysilane, trimethoxysilylpropyldiethylenetriamine, 2-[2-aminoethylamino]ethyltrimethoxysilane, 1,3-bis(4-hydroxybutyl)tetramethyldisiloxane, 1,3-bis(3-hydroxypropyl)tetramethyldisiloxane, and the like.

Surface additives which can be incorporated subsequent to fromation of the toner by known methods, such as mixing, can be selected for the toner compositions of the present invention including, for example, metal salts, metal salts of fatty acids, colloidal silicas, mixtures thereof, and the like, which additives are usually present in an amount of from about 0.1 to about 2 weight percent, reference U.S. Pat. Nos. 3,590,000; 3,720,617; 3,655,374 and 3,983,045, the disclosures of which are totally incorporated herein by reference. Preferred additives include magnesium stearate, zinc stearate and Aerosil R972.

Also, the toner compositions can be rendered conductive with, for example, a volume resistivity, which can be measured in a cell test fixture at 10 volts of from about $1\times10^3$ ohm-cm to about $1\times10^8$ ohm-cm by adding with mixing in effective amounts of, for example, from about 1 to about 10 weight percent to the surface thereof components such as carbon blacks, graphite, copper iodide, and other conductive metal salts, conductive organic or organometallic materials.

The following examples are being submitted to further define various aspects of the present invention. These examples are intended to be illustrative only and are not intended to limit the scope of the present invention. Also, parts and percentages are by weight unless otherwise indicated.

EXAMPLE I

A mixture of 113 grams of lauryl methacrylate, available as Rocryl 320 from Rohm and Haas Company, 3.70 grams each of 2,2'-azobis-(2,4-dimethylvaleronitrile) and 2,2'-azobis-(isobutyronitrile), and a solution of 46.8 grams of Isonate 143L in 20 milliliters of dichloromethane was mixed in a 2-liter Nalgene container with an IKA polytron equipped with a PT 45/M probe at 4,000 rpm for 30 seconds. Three hundred (300) grams of Bayferrox magnetite 8610 was then added, and the resulting mixture was homogenized by high sheer blending with the IKA polytron at 8,000 rpm for 3 minutes. To the mixture was then added 1 liter, 0.14 percent, of aqueous poly(vinyl alcohol) (88 percent hydrolyzed; MW, molecular weight average of 96,000) solution, and thereafter, the mixture was blended at 9,000 rpm with an IKA polytron equipped with a T45/4G probe for 2 minutes. The resulting mixture was then transferred to a 2-liter reaction kettle, and a solution of 31.5 milliliters of 1,4-bis(3-aminopropyl)piperazine in 80 milliliters of water was added. The resulting mixture was mechanically stirred at room temperature for 15 minutes before the addition of 5.7 milliliters of 3-aminopropyltrimethoxysilane. After the addition, the mixture was further stirred for another 45 minutes to complete the interfacial polymerization reaction. Thereafter, the mixture was heated in an oil bath to initiate the core binder-forming free radical polymerization. The temperature of the mixture was gradually raised from room temperature to a final temperature of 90° C. over a period of 1 hour. Heating was continued at this temperature for an additional 5.5 hours, and thereafter the mixture was cooled down to room temperature, about 25° C. The microcapsule toner product formed was then transferred to a 4-liter beaker, and washed repeatedly with water until the washing was clear, and the product was then sieved through a 180 micron sieve to remove coarse material. The resulting wet toner was transferred to a 2-liter beaker and was diluted with water to a total volume of 1.8 liter. Colloidal graphite, 25.7 grams, available as Aquadag E from Acheson Colloids, diluted with 100 milliliters of water, was added to the beaker, and the mixture was spray dried in a Yamato Spray Dryer at an air inlet temperature of 160° C., and an air outlet temperature of 80° C. The air flow was retained at 0.75 $m^3$/minute, while the atomizing air pressure was kept at 1.0 kilogram/$cm^2$. The collected encapsulated dry toner (330 grams) was then screened through a 63 micron sieve. The volume average particle diameter of the toner product, as measured on a 256 channel Coulter Counter, was 17.5 microns with a volume average particle size dispersity of 1.31.

Two hundred and forty (240) grams of the above toner were dry blended with a Greey blender, first with 0.77 gram of carbon black (Black Pearls 2000) for 2 minutes with the blending impeller operating at 3,500 RPM, and then with 3.6 grams of zinc stearate for another 6 minutes at an impeller speed of 3,000 RPM. The latter blending was continued until the volume resistivity of toner was from about $5\times10^4$ to about $5\times10^6$ ohm-cm. For this toner, the final volume resistivity was $1.7\times10^5$ ohm-cm as measured in a cell fixture at 10 volts. After dry blending, the toner was further sieved through a 63 micron sieve. The above prepared toner, which comprises a 3-aminopropyltrimethoxysilane-modified shell and a core of poly(lauryl methacrylate) and Bayferrox 8610 magnetite, was evaluated in an operating Delphax S6000 printer in the following manner. The images, subsequent to formation and development with the above prepared encapsulated toner, were transfixed to paper at 55° C. with a transfix pressure of 2,000 psi. Print quality was evaluated from a checkerboard print pattern. The image optical density was measured with a standard integrating densitometer. Image fix was measured by the standardized tape pull method, and is expressed as a percentage of the retained image optical density after the tape test relative to the original image optical density. Image smearing was evaluated qualitatively by hand rubbing the fused checkerboard print using a blank paper under an applied force for a specific cycle time, and viewing the surface cleanliness of nonprinted and printed areas of the page. Image ghosting was evaluated visually. For the above prepared toner, the image fix level was 85 percent, and no image smear and no image ghosting were observed after 2,000 prints. No agglomeration of the above prepared encapsualted toner was observed after seven months of storage in an enclosed building.

EXAMPLE II

A mixture of 113 grams of lauryl methacrylate, 3.70 grams each of 2,2'-azobis(isobutyronitrile) and 2,2'-azobis(2,4-dimethylvaleronitrile), and 46.8 grams of Isonate 143 L was mixed by high shear blending using an IKA polytron equipped with a T45/M probe at 4,000 rpm for 30 seconds. To the resulting organic mixture was added 300 grams of Bayferrox Magnetite 8610, and the mixture was homogenized for 3 minutes at 8,000 rpm using the aforementioned Brinkmann probe. One liter of 0.07 percent aqueous poly(vinyl alcohol) was then added, and the mixture was homogenized at 9,000 rpm for 2 minutes with an IKA polytron equipped with a T45/4G probe. To the resulting suspension was added a solution of 30.5 milliliters of 1,4-bis(3-aminopropyl)-piperazine and 5.5 milliliters of 3-(2-aminoethylamino)-propyltrimethoxysilane in 80 milliliters of water, and the mixture was transferred to a 2-liter reaction kettle equipped with a mechanical stirrer and a temperature probe. The mixture was stirred at room temperature for 1 hour, and was subsequently heated in an oil bath over a period of 1 hour to a final reaction temperature of 90° C. Heating was continued at this temperature for an additional 5 hours. The reaction mixture was then worked up according to the procedure of Example I except that 25.0 grams instead of 22.7 grams of Aquadag E was employed during the spray drying stage. There were obtained 340 grams of dry encapsulated toner. The volume average particle diameter of the toner was 16.9 microns with a volume average particle size dispersity of 1.33. The toner was then dry blended to yield a final volume resistivity of $1.1\times10^5$ ohm-cm with the cell of Example I. This toner, which is comprised of a 3(2-aminoethylamino)propyltrimethoxysilane-modified shell and a core of poly(lauryl methacrylate) and Bayferrox 8610 magnetite, by repeating the procedure of Example I, was then evaluated in a Delphax S6000 printer, and exhibited a tape fix level of 86 percent. There was no image smear and no image ghosting for 2,000 prints.

EXAMPLE III

An encapsulated toner was prepared by repeating the procedure of Example I with the exception that 300 grams of Northern Pigments magnetite NP-604 instead of Bayferrox magnetite 8610 was employed. In addition, 1 liter of a 0.18 percent aqueous solution of poly(vinyl alcohol) was utilized in the preparation. There resulted 360 grams of dry encapsulated toner. The toner's volume average particle diameter was 15.1 microns with a volume average particle size dispersity of 1.35. This toner, which comprises a 3-aminopropyltrimethoxysilane-modified shell and a core of poly(lauryl methacrylate) and NP-604 magnetite, was machine tested in a Delphax S6000 printer according to the procedure of Example I, and substantially similar results were obtained.

EXAMPLE IV

An encapsulated toner was prepared in accordance with the procedure of Example I except that 265 grams of Northern Pigment magnetite NP-608 and 0.18 percent aqueous poly(vinyl alcohol) solution were utilized in place of 300 grams of Bayferrox 8610 and a 0.14 percent aqueous poly(vinyl alcohol) solution, respectively. A total of 345 grams of dry encapsulated toner product was obtained. The volume average particle diameter for the toner obtained was 16.7 microns with a volume average particle size dispersity of 1.30. The toner product, which comprises a 3-aminopropyltrimethoxysilane-modified shell and a core of poly(lauryl methacrylate) and NP-608 magnetite, was evaluated in a Xerox 4060™ printer according to the procedure of Example I and substantially similar results were obtained.

EXAMPLE V

An encapsulated toner was prepared in accordance with the procedure of Example I with 170 grams of lauryl methacrylate and 30 grams of n-butyl methacrylate in place of 113 grams of lauryl methacrylate. In addition, 200 grams of Columbian magnetite Mapico Black and 0.16 percent of aqueous poly(vinyl alcohol) solution were employed instead of, respectively, 300 grams of Bayferrox 8610 and a 0.14 percent aqueous poly(vinyl alcohol) solution. Furthermore, to render the toner insulating, the wet toner was spray dried without Aquadag E and dry blended with zinc stearate without the carbon black. There were obtained 360 grams of dry encapsulated toner with a volume average particle diameter of 14.1 and a volume average particle size dispersity of 1.34. This toner, which comprises a 3-aminopropyltrimethoxysilane-modified shell and a core of n-butyl methacrylate-lauryl methacrylate copolymeric resin and Mapico Black magnetite, was machine tested in an experimental xerographic machine wherein images were generated, developed with the above prepared toner, transferred to a paper substrate, and subsequently pressure fixed with a pressure roll at 2,5000 psi. The image fix level was 75 percent with clean image background and no offset to the pressure roll.

EXAMPLE VI

An encapsulated toner was prepared in accordance with the procedure of Example I except that 100 grams of lauryl methacrylate and 20 grams of hexyl methacrylate were employed in place of 113 grams of lauryl methacrylate. In addition, 300 grams of Pfizer magnetite MCX 6368 and a 0.20 percent aqueous solution of poly(vinyl alcohol) were utilized in place of, respectively, 300 grams of Bayferrox 8610 and 0.14 percent of poly(vinyl alcohol) solution. There resulted 355 grams of dry encapsulated toner and the toner's volume average particle diameter was 13.7 microns with a volume average particle size dispersity of 1.36. The toner product, which comprises a 3-aminopropyltrimethoxysilane-modified shell and a core of n-hexyl methacrylate-lauryl methacrylate coploymeric resin and Pfizer magnetite MCX 6368, was evaluated in a Delphax S6000 printer according to the procedure of Example I, and substantially similar results were obtained.

EXAMPLE VII

An encapsulated toner was prepared in accordance with the procedure of Example I except that 120 grams of lauryl acrylate and 250 grams of Mapico Black magnetite were employed instead of 113 grams of methacrylate and 300 grams of Bayferrox 8610. A total of 365 grams of a dry encapsulated toner product was obtained. The volume average particle diameter of the obtained toner was 19.8 with a volume average particle size dispersity of 1.29. This toner, which comprises a 3-aminopropyltrimethoxysilane-modified shell and a core of poly(lauryl acrylate) and Mapico Black magnetite, was evaluated in a Xerox 4060™ printer according to the procedure of Example I and substantially similar results were obtained.

EXAMPLE VIII

An encapsulated toner was prepared in accordance with the procedure of Example I using 210 instead of 113 grams of lauryl methacrylate. In addition, a mixture of 125 grams of Degussa Aerosil and 20 grams of copper phthalocyanine was utilized in place of 300 grams of Bayferrox magnetite 8610. The toner product was also spray dried without Aquadag E. A total of 382 grams of dry encapsulated toner product was obtained; its volume average particle diameter was 18.7 microns with a volume average particle size dispersity of 1.33. This blue toner, which comprises a 3-aminopropyltrimethoxysilane-modified shell and a core of poly(lauryl methacrylate), Degussa Aerosil and copper phthalocyanine, was evaluated in a xerographic imaging test fixture similar to the Xerox Corporation 1065™ that generated electrostatic latent images, and the images were subsequently pressure fixed with a suitable pressure roll at 2,000 psi. The image fix level was 84 percent with clean image background, and no offset to the pressure roll.

Other modifications of the present invention may occur to those skilled in the art subsequent to a review of the present application. These modifications, including equivalents thereof, are intended to be included within the scope of the present invention.

What is claimed is:

1. An encapsulated toner composition comprised of a core comprised of a polymer and a pigment or dye or mixtures thereof, which core is encapsulated in a polymeric shell, which shell is formed from the reaction of a shell monomer or monomers with an organosilane having an oxysilyl (I), a dioxysilyl (II) or trioxysilyl (III) function

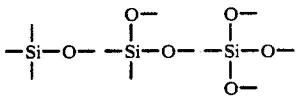

(I) (II) (III)

2. An encapsulated toner composition in accordance with claim 1 wherein the organosilane is selected from the group consisting of 4-aminobutyldimethylmethoxysilane, 4-aminobutylmethyldimethoxysilane, 4-aminobutyltrimethoxysilane, 4-aminobutyltriethoxysilane, N-(2-aminoethyl)-3-aminopropylmethyldimethoxysilane, N-(2-aminoethyl)-3-aminopropyltrimethoxysilane, N-(6-aminihexyl)-3-aminopropyltrimethoxysilane, p-aminophenyltrimethoxysilane, p-N-(2-aminoethyl)-aminomethylphenethyltrimethoxysilane, 3-aminopropylmethyldimethoxysilane, 3-aminopropyltrimethoxysilane, 3-[bis(2-hydroxyethyl)amino]propyltriethoxysilane, trimethoxysilylpropyldiethylenetriamine, 1,3-bis(4-hydroxybutyl)tetramethyldisiloxane, and 1,3-bis(3-hydroxypropyl)tetramethyldisiloxane.

3. An encapsulated toner composition in accordance with claim 1 wherein the core polymer resin is an acrylate, a methacrylate, a styrene polymer, or the copolymers thereof.

4. An encapsulated toner in accordance with claim 1 wherein the pigment is carbon black, magnetite, or mixtures thereof.

5. An encapsulated toner in accordance with claim 1 wherein the pigment is cyan, yellow, magenta, red, green, blue, brown, or mixtures thereof.

6. An encapsulated toner in accordance with claim 1 wherein the pigment is selected from the group consisting of Heliogen Blue, Pylam Oil Blue, Pylam Oil Yellow, Pigment Blue, Pigment Violet, Pigment Red, Lemon Chrome Yellow, Bon Red, NOVAperm Yellow FGL, Hostaperm Pink, 2,9-dimethyl-substituted quinacridone, Dispersed Red, Solvent Red, copper tetra-(octadecyl sulfonamido) phthalocyanine, copper phthalocyanine, diarylide yellow 3,3-dichlorobenzidene acetoacetanilides, a nitrophenyl amine sulfonamide, Dispersed Yellow 2,5-dimethoxy-4-sulfonanilide phenylazo-4'-chloro-2,5-dimethoxy acetoacetanilide, and Permanent Yellow FGL.

7. An encapsulated toner in accordance with claim 1 wherein the shell is present in an amount of from about 1 to 30 weight percent of the toner, the core polymer is present in an amount of from about 20 to about 95 weight percent of the toner, and the pigment or dye is present in an amount of from about 1 to about 65 weight percent of the toner.

8. An encapsulated toner in accordance with claim 1 containing surface additives.

9. An encapsulated toner in accordance with claim 8 wherein the surface additives are metal salts, metal slats of fatty acids, or colloidal silicas.

10. An encapsulated toner in accordance with claim 9 wherein zinc stearate is selected.

11. An encapsulated toner in accordance with claim 9 wherein the additives are present in an amount of from about 0.05 to about 5 weight percent.

12. An encapsulated toner in accordance with claim 1 wherein the core polymer is prepared by free-radical polymerization.

13. An encapsulated toner in accordance with claim 1 wherein the polymeric shell is prepared by interfacial polymerization.

14. An encapsulated toner in accordance with claim 1 wherein the shell contains conductive components.

15. An encapsulated toner in accordance with claim 14 wherein the conductive components are comprised of carbon black, graphite, or mixtures thereof.

16. An encapsulated toner in accordance with claim 1 wherein the core monomer for formation of the core polymer is selected from the group consisting of n-butyl acrylate, s-butyl acrylate, isobutyl acrylate, butyl methacrylate, s-butyl methacrylate, isobutyl methacrylate, benzyl acrylate, benzyl methacrylate, propyl acrylate, isopropyl acrylate, hexyl acrylate, cyclohexyl acrylate, hexyl methacrylate, cyclohexyl methacrylate, lauryl acrylate, lauryl methacrylate, pentyl acrylate, pentyl methacrylate, stearyl acrylate, stearyl methacrylate, ethoxypropyl acrylate, ethoxypropyl methacrylate, heptyl acrylate, heptyl methacrylate, methylbutyl acrylate, methylbutyl methacrylate, m-tolyl acrylate, styrene, dodecyl styrene, hexylmethyl styrene, nonyl styrene, tetradecyl styrene, and mixtures thereof.

* * * * *